United States Patent
Burchell et al.

[11] Patent Number: 6,090,477
[45] Date of Patent: Jul. 18, 2000

[54] GAS STORAGE CARBON WITH ENHANCED THERMAL CONDUCTIVITY

[75] Inventors: Timothy D. Burchell, Oak Ridge; Michael Ray Rogers; Roddie R. Judkins, both of Knoxville, all of Tenn.

[73] Assignee: UT-Battelle, LLC, Oak Ridge, Tenn.

[21] Appl. No.: 09/151,920

[22] Filed: Sep. 11, 1998

[51] Int. Cl.[7] .................................................. C04B 35/52
[52] U.S. Cl. ................... 428/293.4; 428/297.4; 428/299.1; 428/300.4; 428/408; 428/304.4; 428/312.2; 428/293.7; 428/367; 264/29.1; 264/29.6; 264/29.7; 95/114
[58] Field of Search ............................ 428/293.4, 297.4, 428/299.1, 300.4, 408, 304.4, 312.2, 293.7, 367; 95/114; 264/29.6, 29.1, 29.7

[56] References Cited

U.S. PATENT DOCUMENTS

| | | | |
|---|---|---|---|
| 4,506,028 | 3/1985 | Fukuda et al. | 502/101 |
| 5,230,960 | 7/1993 | Iizuka | 428/408 |
| 5,648,027 | 7/1997 | Tajiri et al. | 264/43 |
| 5,665,464 | 9/1997 | Takayasu et al. | 428/312.2 |
| 5,744,075 | 4/1998 | Klett et al. | 264/29.6 |
| 5,750,058 | 5/1998 | Hecht et al. | 264/29.6 |
| 5,827,355 | 10/1998 | Wilson et al. | 95/114 |
| 5,871,838 | 2/1999 | Klett et al. | 428/293.4 |

FOREIGN PATENT DOCUMENTS

| | | | |
|---|---|---|---|
| 01036670-B | 8/1989 | Japan | C01B 31/02 |

OTHER PUBLICATIONS

Dissertation abstracts international. vol. 56/09–B, p. 5022., 208 pages. By J. W. Klett, 1994.

J. P. Barbosa Mota, A Theoretical Study of the Impact of Heavy Impurities on the Performance of Natural Gas Adsorptive Storage Systems, in Proc. 23nd Biennial Conf. On Carbon, pub. American Carbon Society, Jul. 1997.

J. M. Gurgel et al, *The Chemical Engineering Journal* 44, 43, 1990.

J. J. Guilleminot et al, *Int. J. Heat Mass Transfer* 30, 1595, 1987.

R. E. Critoph et al, *Int. J. Heat Mass Transfer* 38, 1577, 1995.

T. D. Burchell et al, *Carbon*, 35, 1279–1294 (1997). [Reached addressee on Oct. 28, 1997.]

T. D. Burchell et al, in Proc. 23rd Biennial Conf. On Carbon, p. 158, pub. American Carbon Society, Jul. 1997.

N. D. Parkyns et al, Natural Gas Adsorbed on Carbon, Chap. 11 in *Porosity in Carbons*, J. W. Patrick, ed., pp. 291–325, pub. Halstead Press, 1995.

*Primary Examiner*—William Krynski
*Assistant Examiner*—B. Shewareged
*Attorney, Agent, or Firm*—Kirk A. Wilson; Joseph A. Marasco

[57] ABSTRACT

A carbon fiber carbon matrix hybrid adsorbent monolith with enhanced thermal conductivity for storing and releasing gas through adsorption and desorption is disclosed. The heat of adsorption of the gas species being adsorbed is sufficiently large to cause hybrid monolith heating during adsorption and hybrid monolith cooling during desorption which significantly reduces the storage capacity of the hybrid monolith, or efficiency and economics of a gas separation process. The extent of this phenomenon depends, to a large extent, on the thermal conductivity of the adsorbent hybrid monolith. This invention is a hybrid version of a carbon fiber monolith, which offers significant enhancements to thermal conductivity and potential for improved gas separation and storage systems.

1 Claim, 3 Drawing Sheets

The Effect of Mesophase Pitch Fiber Content on the Temperature Dependence of Thermal Conductivity for Gas Storage Carbon Monoliths

GAS STORAGE CARBON WITH ENHANCED THERMAL CONDUCTIVITY

CROSS-REFERENCE TO RELATED APPLICATIONS

U.S. patent application Ser. No. 08/747,109, filed Nov. 8, 1996 entitled *Activated Carbon Fiber Composite Material and Method of Making* is herein incorporated by reference.

U.S. patent application Ser. No. 08/825,507 filed Mar. 31, 1997 entitled *Electrical Swing Adsorption Gas Storage and Delivery System* is herein incorporated by reference.

The United States Government has rights in this invention pursuant to contract no. DE-AC05-96OR22464 between the United States Department of Energy and Lockheed Martin Energy Research Corporation.

FIELD OF THE INVENTION

The present invention relates to a porous gas storage carbon fiber carbon matrix hybrid adsorbent monolith with enhanced thermal conductivity.

BACKGROUND OF THE INVENTION

Granular activated carbons (GAC) are widely used for gas separation and storage. During operation, GAC beds can develop large temperature gradients that reduce the efficiency of the adsorption or storage system in which they are operating. The magnitude of this temperature gradient depends upon the heat of adsorption of the gas being adsorbed or desorbed, the thermal conductivity of the GAC bed, and the heat transfer coefficient of the containment vessel. Typically, the temperature drop in a packed carbon bed during desorption of a gas is several tens of degrees. For example, Barbosa Mota [1] reports that for a natural gas storage vessel discharged from a pressure of 35 atmospheres (atm.) to 1.2 atm., over a period of 1.6 hours, the bed temperature dropped from 20° C. to −19° C., a drop of 39° C. Since the volume of gas desorbed at a given pressure decreases as the GAC temperature decreases, a large amount of gas is retained on the carbon and is thus not available for use. The thermal conductivity of GAC is inherently low because of the disordered structure of the carbon, and its low bulk density (typically 0.4–1.0 g/cm$^3$). The thermal conductivity of a packed bed of GAC is even lower because of the low pack density of the bed (typically 0.4–0.6 g/cm$^3$) and the additional particle to particle contact resistance.

Thermal conductivity data for GAC in packed beds are somewhat limited. Gurgel and Grenier [2] report thermal conductivity measurements made using a steady state method on a packed bed of commercial GAC (AC 35 supplied by CECA) in the presence of methanol. The reported packed carbon bed conductivity varied with methanol pressure over the range 0–110 millibar, from 0.14 W/m•K to 0.17 W/m•K at a packing density of 0.65 g/cm$^3$. The derived grain conductivity for the GAC was 0.61–0.65 W/m•K for methanol adsorbate concentrations from 0 to 0.3 g/g. Measurements on the same GAC by Guilleminot et al [3] yielded a bed thermal conductivity of 0.19 W/m•K. Critoph and Turner [4] have measured the conductivity of packed carbon beds in the presence of ammonia. The carbon used in their work was a coconut shell GAC (type 208C) supplied by Sutcliffe-Speakman Co. Ltd. The reported bed thermal conductivity was 0.165 W/m•K in the presence of ammonia, and the grain conductivity varied from 0.85–1.25 W/m•K as a non-linear function of concentration. Although the bed packed-density was not explicitly reported by Critoph and Turner, it can be estimated to be approximately 0.5 g/cm$^3$.

BRIEF SUMMARY OF THE INVENTION

U.S. patent application Ser. No.08/747,109, filed Nov. 8, 1996 entitled *Activated Carbon Fiber Composite Material (CFCMS) and Method of Making* disclosed a material with similar thermal conductivity (K=0.14 W/m•K) to that of a packed bed of GAC, yet has a density of approximately half that of the packed beds reported in the literature [2–5]. Thermal conductivity increases with density. Consequently, manufacturing a CFCMS monolith at a higher density (comparable to the packed GAC bed, i.e. 0.6 g/cm$^3$) increased the thermal conductivity of the monolith to a value in the range 0.25–0.3 W/m•K. Thermal conductivity of 0.25–0.3 W/m•K found in the instant invention is a significant improvement over the thermal conductivity of conventional packed carbon beds (0.14–0.19 W/m•K) [2–4]. Moreover, the thermal conductivity of the CFCMS monolith is further increased by the addition of highly conductive carbon fibers. The use of a hybrid monolith with enhanced thermal conductivity reduces the temperature gradients in a gas storage or separation vessel and thus results in process efficiency improvements.

DETAILED DESCRIPTION OF THE INVENTION

Figure 1:
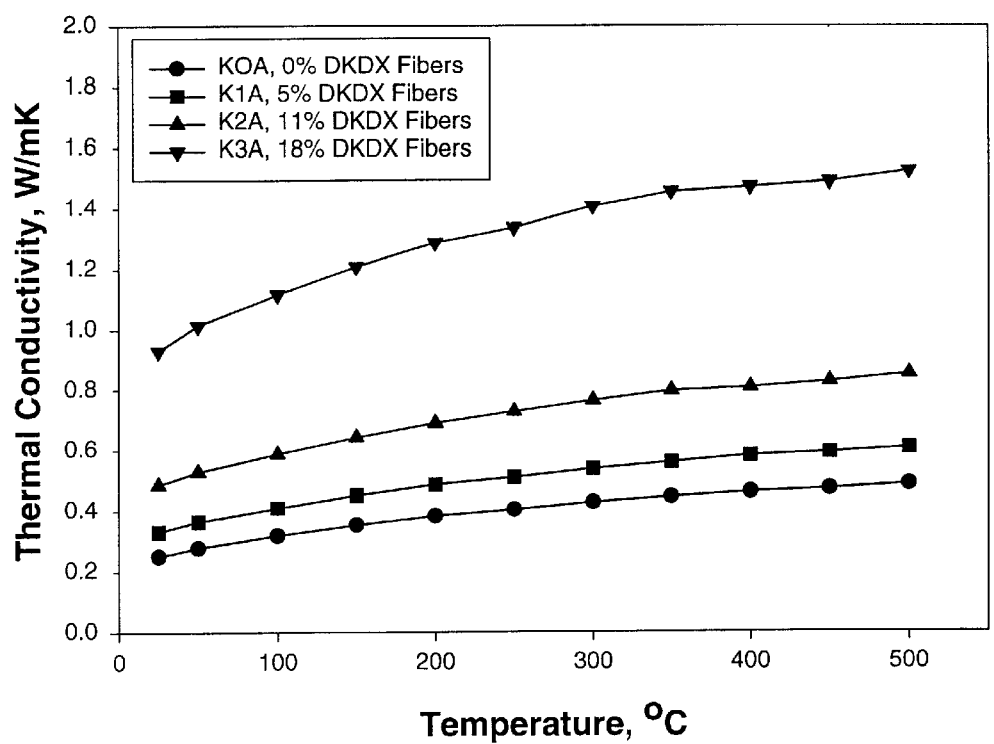
FIG. 1 is a graph showing the effect of mesophase pitch fiber content on the temperature dependence of thermal conductivity for gas storage monoliths.
Figure 2:
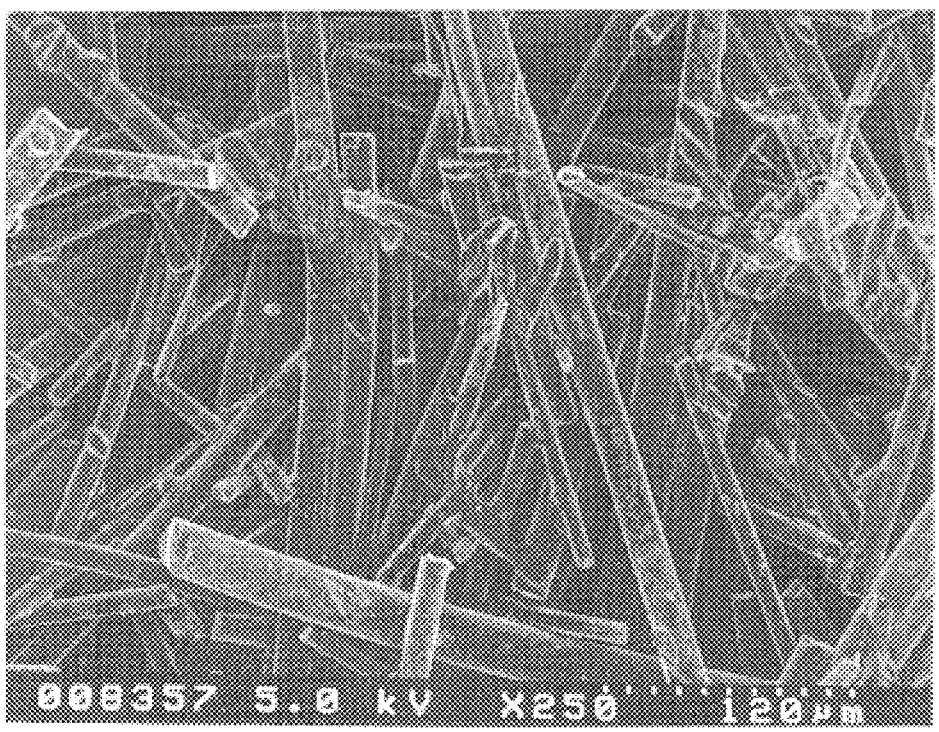
FIG. 2 is a X250 magnification electron micrograph of the gas storage monolith designated sample K3A.
Figure 3:
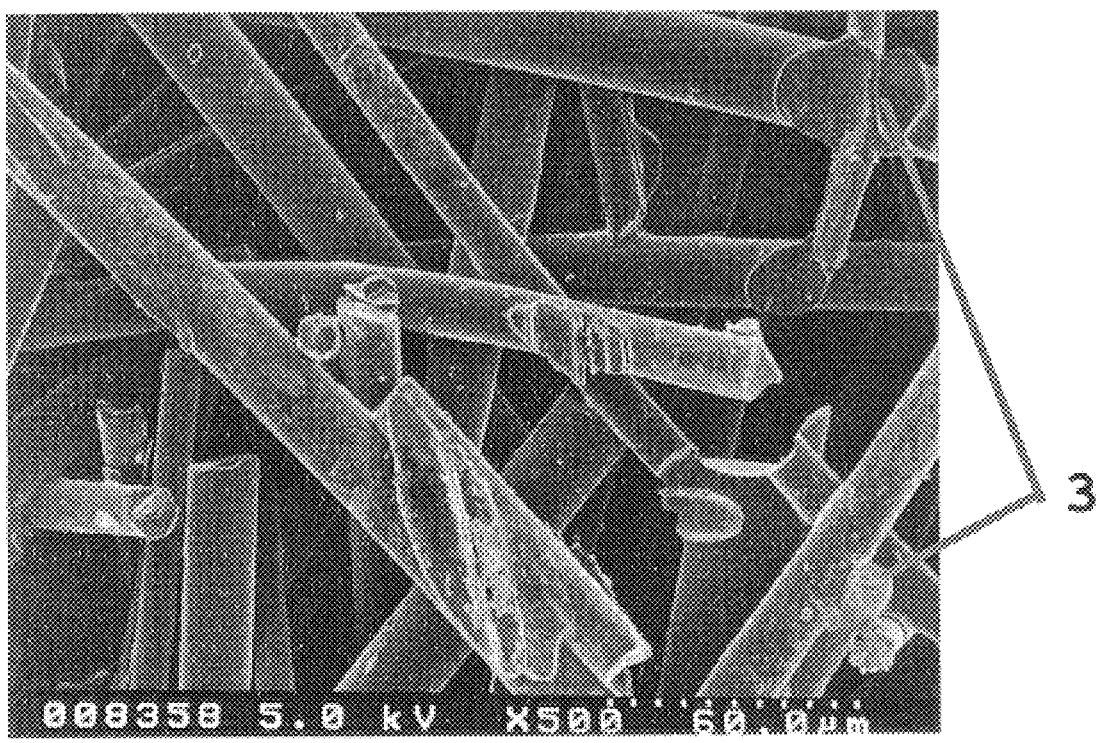
FIG. 3 is a X500 magnification electron micrograph of the gas storage monolith designated sample K3A.
Figure 4:
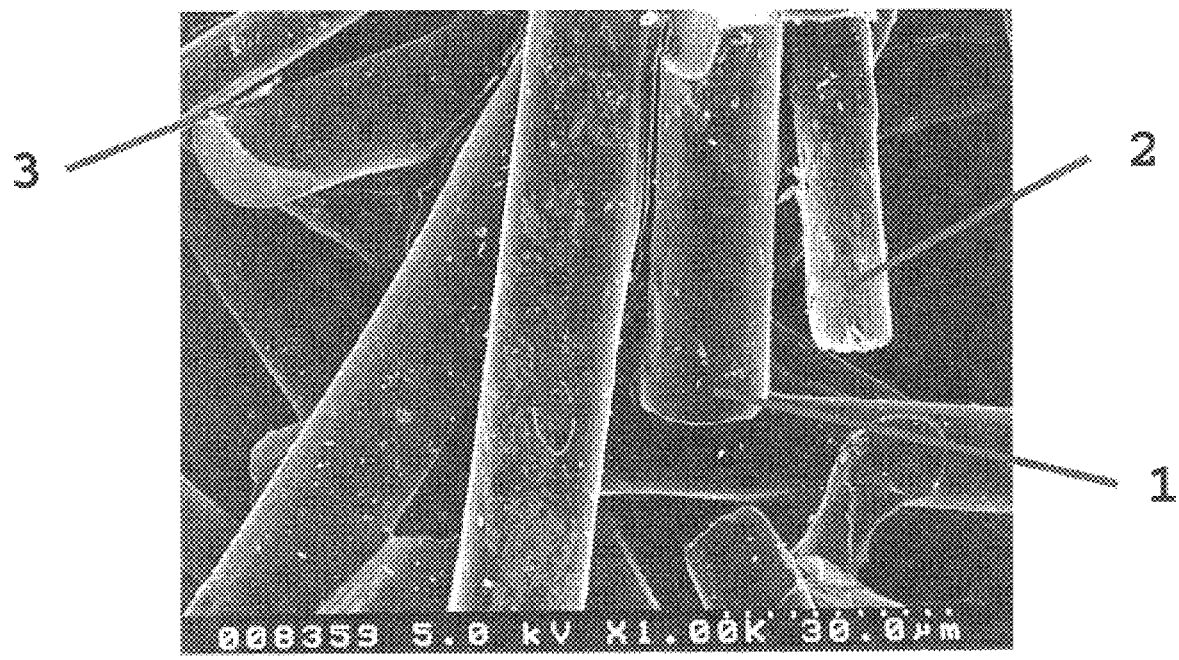
FIG. 4 is a X1000 magnification electron micrograph of the gas storage monolith designated sample K3A.
Figure 5:
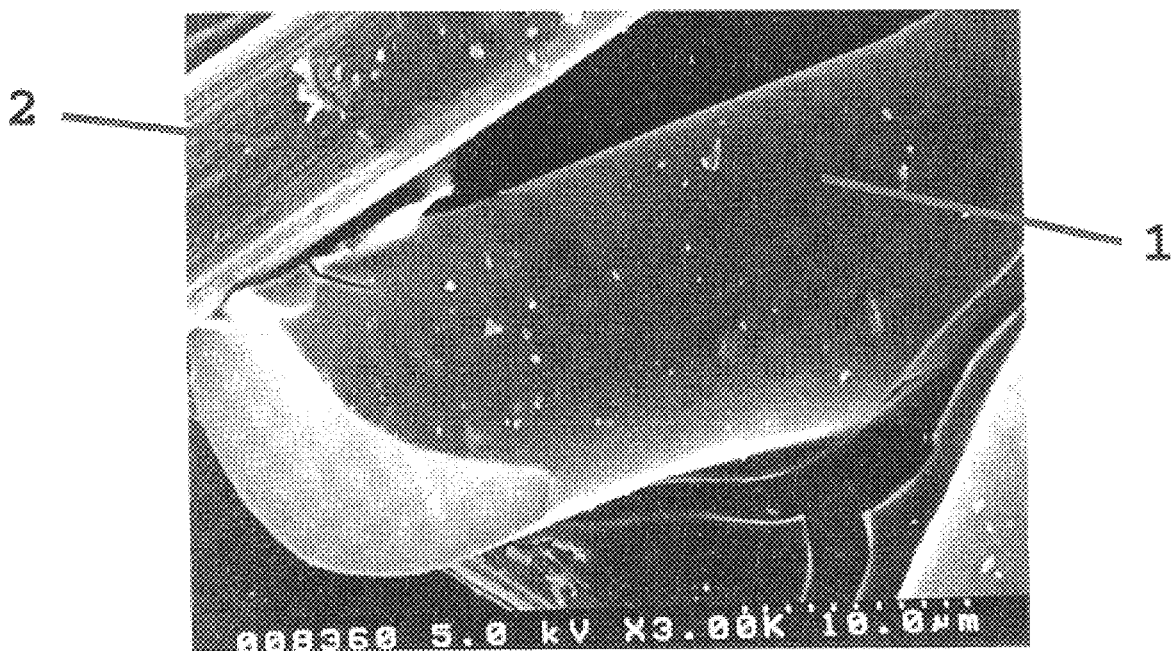
FIG. 5 is a X3000 magnification electron micrograph of the gas storage monolith designated sample K3A.

A series of high density hybrid adsorbent monoliths were manufactured from blends of isotropic pitch derived carbon fibers (type P-400 supplied by the Anshan East Asia Carbon Company, Anshan, China) and mespohase pitch derived carbon fibers (type DKDX supplied by Amoco Performance Products, Alpharetta, Ga.). The manufacturing process was similar to that previously disclosed in U.S. patent application Ser. No.08/747,109, filed Nov. 8, 1996 entitled *Activated Carbon Fiber Composite Material and Method of Making* except that (i) a blend of fibers was used, and (ii) the hybrid monoliths manufactured were hot pressed at 300° C. at low pressures. The binder used was a powdered phenolic resin. The hybrid monoliths were carbonized at 650° C. in a nitrogen atmosphere. Table 1 reports the composition, dimensions and densities of the hybrid monoliths produced.

TABLE 1

Carbon fiber adsorbent hybrid monolith formulations and densities (post carbonization)

| SPECIMEN | MASS (g) | DIAMETER (cm) | LENGTH (cm) | DENSITY (g/cm$^3$) | MASS FRACTION OF CONSTITUENTS IN MONOLITH (%) | | |
|---|---|---|---|---|---|---|---|
| | | | | | RESIN CHAR(a) | ISOTROPIC PITCH FIBER | MESOPHASE PITCH FIBER |
| K0-A | 243.83 | 11.46 | 3.94 | 0.60 | 11 | 89 | 0 |
| K1-A | 246.46 | 11.48 | 4.23 | 0.56 | 11 | 84 | 5 |
| K2-A | 256.81 | 11.48 | 3.86 | 0.64 | 11 | 78 | 11 |
| K3-A | 246.94 | 11.46 | 3.66 | 0.65 | 11 | 71 | 18 |

(a)Assumes a 50% char yield from the phenolic resin.

Small samples were taken from the carbonized hybrid monoliths and the thermal conductivity measured over the temperature range 25–500° C. using the thermal flash method. The room temperature thermal conductivity of the specimens are reported in Table 2.

TABLE 2

Room temperature thermal conductivity of carbon fiber based adsorbent hybrid monoliths

| SPECIMEN | DKDX FIBER CONTENT (%) | DENSITY (g/cm$^3$) | THERMAL CONDUCTIVITY (W/m · K) |
|---|---|---|---|
| K0-A | 0 | 0.606 | 0.250 |
| K2-A | 11 | 0.645 | 0.485 |
| K3-A | 18 | 0.634 | 0.930 |

Significant observations from Table 2 include, first, the thermal conductivity in the higher density samples is greater than the thermal conductivity of the CFCMS material disclosed in U.S. patent application 08/747,109; *Activated Carbon Fiber Composite Material* (CFCMS) *and Method of Making*. Also, the thermal conductivity increases with increasing DKDX fiber content. Moreover, a comparison with the literature data discussed previously [1–4] reveals that the hybrid monoliths have higher thermal conductivity than can be expected for a packed bed of GAC (0.14 to 0.19 W/m•K). The enhancement is as much as a factor of five or six for the 18% DKDX high density hybrid monolith.

Improved thermal conductivity of the hybrid monoliths compared to standard CFCMS can be attributed to the following: (i) isotropic pitch derived carbon fibers have a higher density than GAC, thus they can be expected to have a greater thermal conductivity; (ii) the DKDX mesophase pitch derived fibers have a thermal conductivity of 500–700 W/m•K; (iii) the thermal conductivity increases with increasing bulk density because there is physically more carbon available to conduct the heat; (iv) there is increased connectivity between the fibers in the high density monoliths and hybrids.

The temperature dependence of the thermal conductivity of the adsorbent hybrid monoliths is shown in FIG. 1. The thermal conductivity increases with density and DKDX fiber content for the reasons discussed above. The increase in thermal conductivity with temperature is due to increased in-pore radiation of heat at higher temperatures.

These high density and hybrid monoliths clearly have superior thermal conductivity compared with both CFCMS and GAC beds. However, to be useful as a gas storage or separation media the hybrid monoliths must be activated to develop the micropore volume and surface area. Consequently, six of the hybrid monoliths were activated as previously disclosed in U.S. patent application Ser. No.08/747,109, filed Nov. 8, 1996 entitled *Activated Carbon Fiber Composite Material* (CFCMS) *and Method of Making*. Table 3 below reports the BET surface area and DR micropore volume of the hybrid monoliths activated to low burn-off. Comparative data for the CFCMS material activated in an identical fashion are given in Table 4.

TABLE 3

BET surface area and DR micropore volume data for carbon fiber based hybrid adsorbent monoliths

| SPECIMEN | DKDX FIBER CONTENT (%) | BURN-OFF (%) | BET SURFACE AREA (m$^2$/g) | DR MICROPORE VOLUME (cm$^3$/g) |
|---|---|---|---|---|
| K0-A | 0 | 5.5 | 429 | 0.16 |
| K1-A | 5 | 7.2 | 406 | 0.16 |
| K3-A | 18 | 4.3 | 307 | 0.12 |
| K0B | 0 | 5.6 | 445 | 0.16 |
| K1B | 5 | 9.4 | 540 | 0.21 |
| K3B | 18 | 5.3 | 429 | 0.17 |

The data in Tables 3 and 4 show that the hybrid monoliths activate in a similar fashion to standard CFCMS. For example, SMW-3 (Table 4) has a burn-off of 9.4% and a BET surface area of 528 m$^2$/g compared with K1B (Table 3) with an identical burn-off and a BET surface area of 540 m$^2$/g. Likewise, the DR micropore volumes are very similar for the two materials.

TABLE 4

BET surface area and DR micropore volume data for standard CFCMS material [6]

| SPECIMEN ID | BURN-OFF | BET SURFACE AREA (m$^2$/g) | DR MICROPORE VOLUME (cm$^3$/g) |
|---|---|---|---|
| SMW-1 | 10 | 496 | 0.22 |
| SMW-3 | 9.4 | 528 | 0.20 |
| SMW-4 | 8.5 | 714 | 0.27 |
| SMW-8 | 13.4 | 574 | 0.22 |

This hybrid adsorbent monolith develops a similar micropore structure as the CFCMS. This is to be expected since it is largely comprised of the same fiber (P400) as the CFCMS. Therefore, we expect the hybrid monoliths to adsorb gases as efficiently as standard CFCMS. Moreover, the high density and hybrid monoliths have a substantially increased thermal conductivity over the CFCMS. Thus the high density and hybrid monolith disclosed here represent a significant enhancement of CFCMS.

To demonstrate the natural gas (NG) storage capacity of higher density monoliths, a series of samples were prepared and activated. Table 5 reports the final density, burn-off, BET surface area, DR micropore volume, and natural gas storage capacity of the samples.

TABLE 5

Micropore data and NG storage capacities for high density, high thermal conductivity monoliths

| Monolith Identity | Final Density (g/cm$^3$) | Burn-off (%) | BET Surface Area (m$^2$/g) | DR Micropore Volume (cm$^3$/g) | NG Storage Capacity (STP V/V @ 500 psi) |
|---|---|---|---|---|---|
| SMS-2B | 0.47 | 3.20 | 941 | 0.36 | 76 |
| SMS-3B | 0.40 | 32.0 | 1283 | 0.49 | 84 |
| SMS-5A | 0.50 | 38.4 | 1608 | 0.60 | 104 |

From the data reported in Table 5 it is evident that activated monoliths can attain storage capacities >100 V/V (volume/volume at standard temperature and pressure), which is comparable to current commercially available GAC materials [7]. In addition, because of the greater degree of connectivity between the carbon fibers (provided by the carbonized resin binder) these higher density monoliths offer substantially increased thermal conductivity over packed beds of granular activated carbon. The continuous nature of the carbon structure is clearly evident in the micrographs contained in FIGS. 2 through 5.

FIGS. 2 through 5 show electron micrographs of Specimen K3A comprising isotropic pitch derived carbon fibers 1 and mesophase pitch derived carbon fibers 2. This specimen contains 18% by weight of the DKDX mesophase fibers 2. The isotropic pitch derived fibers 1 are distinguishable by their larger diameter. Moreover, the mesophase pitch fibers 2 have an observable texture (see the two higher magnification pictures), whereas the isotropic pitch fibers 1 are featureless.

Note also the high level of connectivity between the fibers afforded by the resin derived carbon binder 3. This connectivity, absent in a packed bed of carbon granules, significantly enhances the thermal conductivity of the monoliths, even in the absence of the DKDX fibers. This is demonstrated by the high thermal conductivity of sample KO-A in Table 2.

REFERENCES

1. J. P. Barbosa Mota. A theoretical study of the impact of heavy impurities on the performance of natural gas adsorptive storage systems. In, Proc. 23$^{rd}$ Biennial Conf. on Carbon, Pub. American Carbon Society, July 1997.
2. J. M. Gurgel and P. H. Grenier, *The Chemical Engineering Journal* 44, 43 (1990).
3. J. J. Guilleminot, F. Meunier and J. Pakleza, *Int. J. Heat Mass Transfer* 30, 1595 (1987).
4. R. E. Critoph and L. Turner, *Int. J. Heat Mass Transfer* 38, 1577 (1995).
5. T. D. Burchell, R. R. Judkins and M. R. Rogers, A. M. Williams, CARBON, 35, 1279–1294 (1997).
6. T. D. Burchell, R. R. Judkins and M. R. Rogers, In, Proc. 23$^{rd}$ Biennial Conf. on Carbon, page 158, Pub. American Carbon Society, July 1997.
7. N. D. Parkyns and D. F. Quinn, Natural Gas Adsorbed on Carbon, Chapter 11 in *Porosity in Carbons,* J. W. Patrick, Editor, pp. 291–325. Pub. Halstead Press, (1995).

We claim:

1. A porous activated carbon fiber carbon matrix hybrid monolith comprising:

approximately 71% to 89% of a first isotropic pitch derived carbon fiber, up to 18% of a second mesophase pitch derived carbon fiber, and up to 29% of a carbonizable organic binder, said monolith having a thermal conductivity in the range of approximately 0.25 to 0.93 W/m•K.

* * * * *